(12) United States Patent
Lee et al.

(10) Patent No.: US 10,862,181 B2
(45) Date of Patent: Dec. 8, 2020

(54) BATTERY PACK AND VEHICLE COMPRISING BATTERY PACK

(71) Applicant: LG CHEM, LTD., Seoul (KR)

(72) Inventors: Yoon-Koo Lee, Daejeon (KR); Jeong-O Mun, Daejeon (KR); Mi-Geum Choi, Daejeon (KR)

(73) Assignee: LG CHEM, LTD., Seoul (KR)

( * ) Notice: Subject to any disclaimer, the term of this patent is extended or adjusted under 35 U.S.C. 154(b) by 220 days.

(21) Appl. No.: 15/770,706

(22) PCT Filed: Jan. 16, 2017

(86) PCT No.: PCT/KR2017/000534
§ 371 (c)(1),
(2) Date: Apr. 24, 2018

(87) PCT Pub. No.: WO2017/188560
PCT Pub. Date: Nov. 2, 2017

(65) Prior Publication Data
US 2018/0316070 A1    Nov. 1, 2018

(30) Foreign Application Priority Data

Apr. 25, 2016 (KR) .................. 10-2016-0050171

(51) Int. Cl.
*H01M 10/6557* (2014.01)
*H01M 2/10* (2006.01)
(Continued)

(52) U.S. Cl.
CPC ..... *H01M 10/6557* (2015.04); *H01M 2/1077* (2013.01); *H01M 10/0413* (2013.01);
(Continued)

(58) Field of Classification Search
CPC ............. H01M 10/615; H01M 10/647; H01M 10/6556; H01M 10/613; H01M 10/6557; H02J 7/0042
(Continued)

(56) References Cited

U.S. PATENT DOCUMENTS 5,756,227 A * 5/1998 Suzuki ...................... F28F 3/02
429/120
2005/0231158 A1* 10/2005 Higashino ........... H01M 10/613
320/112
(Continued)

FOREIGN PATENT DOCUMENTS

CN         203580593 U    5/2014
DE    10 2012 221 503 A1    3/2014
(Continued)

OTHER PUBLICATIONS

International Search Report issued in PCT/KR2017/000534 (PCT/ISA/210), dated Apr. 18, 2017.
(Continued)

*Primary Examiner* — Edward Tso
*Assistant Examiner* — Aaron Piggush
(74) *Attorney, Agent, or Firm* — Birch, Stewart, Kolasch & Birch, LLP

(57) ABSTRACT

Disclosed is a battery pack, which includes a battery cell assembly having at least one battery cell; a pack casing having an input port and an output port provided at one side thereof so that a coolant flows in and out to cool the battery cell, the pack casing accommodating the battery cell assembly to fix and support the battery cell assembly; and a coolant supply and circulation unit connected to communicate with the input port and the output port to supply and circulate the coolant into the pack casing so that each battery cell is cooled in contact with the coolant.

11 Claims, 5 Drawing Sheets

(51) Int. Cl.
*H01M 10/613* (2014.01)
*H01M 10/6556* (2014.01)
*H01M 10/6568* (2014.01)
*H01M 10/647* (2014.01)
*H01M 10/04* (2006.01)
*H01M 10/625* (2014.01)
*H01M 10/615* (2014.01)
*H01M 10/663* (2014.01)

(52) U.S. Cl.
CPC ..... *H01M 10/0481* (2013.01); *H01M 10/613* (2015.04); *H01M 10/615* (2015.04); *H01M 10/625* (2015.04); *H01M 10/647* (2015.04); *H01M 10/6556* (2015.04); *H01M 10/6568* (2015.04); *H01M 10/663* (2015.04)

(58) Field of Classification Search
USPC .......................... 320/107, 116; 429/437, 72
See application file for complete search history.

(56) References Cited

U.S. PATENT DOCUMENTS

| | | | | |
|---|---|---|---|---|
| 2013/0207459 | A1* | 8/2013 | Schroder | H01M 10/647 307/10.1 |
| 2014/0014418 | A1* | 1/2014 | Komaki | H01M 10/0481 180/65.1 |
| 2015/0270590 | A1 | 9/2015 | Okutani et al. | |
| 2015/0311485 | A1 | 10/2015 | Fister et al. | |
| 2016/0233465 | A1 | 8/2016 | Lee et al. | |
| 2017/0012330 | A1 | 1/2017 | Kim et al. | |
| 2017/0125858 | A1* | 5/2017 | Miller | H01M 10/6567 |

FOREIGN PATENT DOCUMENTS

| | | |
|---|---|---|
| EP | 2 669 917 A1 | 12/2013 |
| EP | 3 291 360 A1 | 3/2018 |
| JP | 12-016820 Y | 11/1937 |
| JP | 56-104185 U | 9/1984 |
| JP | 62-202457 U | 12/1987 |
| JP | 07-101297 A | 4/1995 |
| JP | 08-310256 A | 11/1996 |
| JP | 2003-346924 A | 12/2003 |
| JP | 2006-315018 A | 11/2006 |
| JP | 2008-181734 A | 8/2008 |
| JP | 2010-244863 A | 10/2010 |
| JP | 2013-051100 A | 3/2013 |
| JP | 2014-022151 A | 2/2014 |
| JP | WO2014/068947 A1 | 5/2014 |
| JP | 2015-159032 A | 9/2015 |
| KR | 10-2013-0107990 A | 10/2013 |
| KR | 10-2013-0122057 A | 11/2013 |
| KR | 10-1425569 B1 | 8/2014 |
| KR | 10-1547395 B1 | 8/2015 |
| KR | 10-2015-0099965 A | 9/2015 |
| KR | 10-2016-0016543 A | 2/2016 |

OTHER PUBLICATIONS

Englith translation of Written Opinion of the International Search Report for Appl. No. PCT/KR2017/000534 dated Apr. 18, 2017.

* cited by examiner

BATTERY PACK AND VEHICLE COMPRISING BATTERY PACK

TECHNICAL FIELD

The present disclosure relates to a battery pack, and more particularly, to a battery pack having an improved cooling structure and improved space efficiency and a vehicle including the battery pack.

The present application claims priority to Korean Patent Application No. 10-2016-0050171 filed on Apr. 25, 2016 in the Republic of Korea, the disclosures of which are incorporated herein by reference.

BACKGROUND ART

Secondary batteries which are highly applicable to various products and exhibit superior electrical properties such as high energy density, etc. are commonly used not only in portable devices but also in electric vehicles (EVs) or hybrid electric vehicles (HEVs) driven by electrical power sources. The secondary battery is drawing attentions as a new energy source for enhancing energy efficiency and environment friendliness in that the use of fossil fuels can be reduced greatly and no byproduct is generated during energy consumption.

Secondary batteries widely used at the preset include lithium ion batteries, lithium polymer batteries, nickel cadmium batteries, nickel hydrogen batteries, nickel zinc batteries and the like. An operating voltage of the unit secondary battery cell, namely a unit battery cell, is about 2.5V to 4.2V. Therefore, if a higher output voltage is required, a plurality of battery cells may be connected in series to configure a battery pack. In addition, depending on the charge/discharge capacity required for the battery pack, a plurality of battery cells may be connected in parallel to configure a battery pack. Thus, the number of battery cells included in the battery pack may be variously set according to the required output voltage or the demanded charge/discharge capacity.

Meanwhile, when a plurality of battery cells are connected in series or in parallel to configure a battery pack, it is common to configure a battery module composed of a plurality of battery cells first, and then configure a battery pack by using a plurality of battery modules and adding other components.

In other words, the battery module has a structure in which a plurality of battery cells are stacked laterally or vertically, and then an outer frame (an end plate) for protecting and fixing the battery cells is attached to the top or bottom surface of the battery cells. Also, the battery module is accommodated in a battery and fixed thereto.

In addition, a battery pack including multiple battery modules is manufactured so that a plurality of secondary batteries are densely packed in a narrow space, and thus it is important to easily dissipate the heat generated from each secondary battery. The secondary battery is charged or discharged by the electrochemical reaction as described above. Thus, if the heat of the battery module generated during the charging/discharging process is not effectively removed, heat accumulation occurs, which may promote degradation of the battery modules and on occasions cause ignition or explosion. For this reason, a high-output large-capacity battery pack essentially requires a cooling device for cooling the battery cells included therein.

However, in the conventional battery pack, the space occupied by the cooling device such as a cooling pin or a heatsink is large, which inevitably deteriorates the space efficiency of the battery cells, and due to the added cooling structure, the manufacturing cost of the battery pack is increased.

In addition, the conventional battery pack has a dual structure including a separate outer frame (an end plate) for fixing a plurality of stacked battery cells and maintaining rigidity and an additional pack case for accommodating and supporting the same, which however increases the manufacturing cost and also is contrary to the recent lightweight trend of secondary batteries.

DISCLOSURE

Technical Problem

Therefore, the present disclosure is directed to providing a battery pack which may have improved space efficiency and reduced manufacturing costs by directly circulating a coolant to battery cells, and which may also be firmly supported in a pack casing and allow a lightweight design of a secondary battery with a reduced manufacturing cost while maintaining rigidity even though a separate outer frame (an end plate) surrounding the battery cells is not used, and is also directed to providing a vehicle including the battery pack.

Technical Solution

In one aspect of the present disclosure, there is provided a battery pack, comprising: a battery cell assembly having at least one battery cell; a pack casing having an input port and an output port provided at one side thereof so that a coolant flows in and out therethrough to cool the battery cell, the pack casing accommodating the battery cell assembly to fix and support the battery cell assembly; and a coolant supply and circulation unit connected to communicate with the input port and the output port to supply and circulate the coolant into the pack casing so that each battery cell is cooled in contact with the coolant.

The pack casing may include: a casing body having a plurality of horizontal partitions and vertical partitions to form an accommodation space in which the battery cell assembly is accommodated; a casing cover provided at an upper surface of the casing body; and an elastic pressing unit provided on the casing cover to elastically press the battery cell assembly.

The casing body may be depressed with a slope or at a right angle corresponding to a planar surface of the battery cell to form a placing groove in which the battery cell assembly is placed.

The elastic pressing unit may have a pair of inclined regions and a depressed region connecting ends of the inclined regions to be depressed from a planar surface of the casing cover, and at least a part of the depressed region of the elastic pressing unit may support in contact with a top surface of the battery cell assembly to press the battery cell assembly downwards.

An adhesive member may be interposed between the battery cell assembly and the elastic pressing unit to fix the battery cell assembly and the elastic pressing unit to each other.

The casing body and the casing cover may be coupled by using screws, and the casing cover may have first coupling holes formed at regular intervals along a periphery of the elastic pressing unit through the casing cover in a thickness direction, and second coupling holes may be formed in the horizontal partitions and the vertical partitions along a length direction at locations corresponding to the first coupling holes so that the screws are accommodated therein.

A placing and supporting portion may be formed at the first coupling hole by depressing an inner side of the first coupling hole along a length direction so that the screw is placed and supported thereat, and a sealing member may be interposed between the placing and supporting portion and a top surface of the second coupling hole to prevent the coolant from leaking out.

At least one coolant circulation hole may be formed in the horizontal partition and the vertical partition.

The casing cover and the elastic pressing unit may be provided integrally by means of press working.

The pack casing may be made of aluminum material, and the coolant may be an insulating oil.

In addition, the present disclosure provides a vehicle comprising: a battery pack according to the above embodiments.

Advantageous Effects

According to an embodiment of the present disclosure, the battery pack may have improved space efficiency and a simplified structure by directly circulating a coolant in contact with battery cells, since a conventional cooling device such as a cooling pin or a heatsink may be not used.

Also, according to another embodiment of the present disclosure, even though a conventional outer frame (an end plate) is not used, the battery pack may maintain rigidity and allow a lightweight design while the battery cells are firmly supported in the pack casing.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

The present disclosure will become more apparent by describing in detail the embodiments of the present disclosure with reference to the accompanying drawings. It should be understood that the embodiments disclosed herein are illustrative only for better understanding of the present disclosure, and that the present disclosure may be modified in various ways. In addition, for ease understanding of the present disclosure, the accompanying drawings are not drawn to real scale, but the dimensions of some components may be exaggerated.

Figure 1:
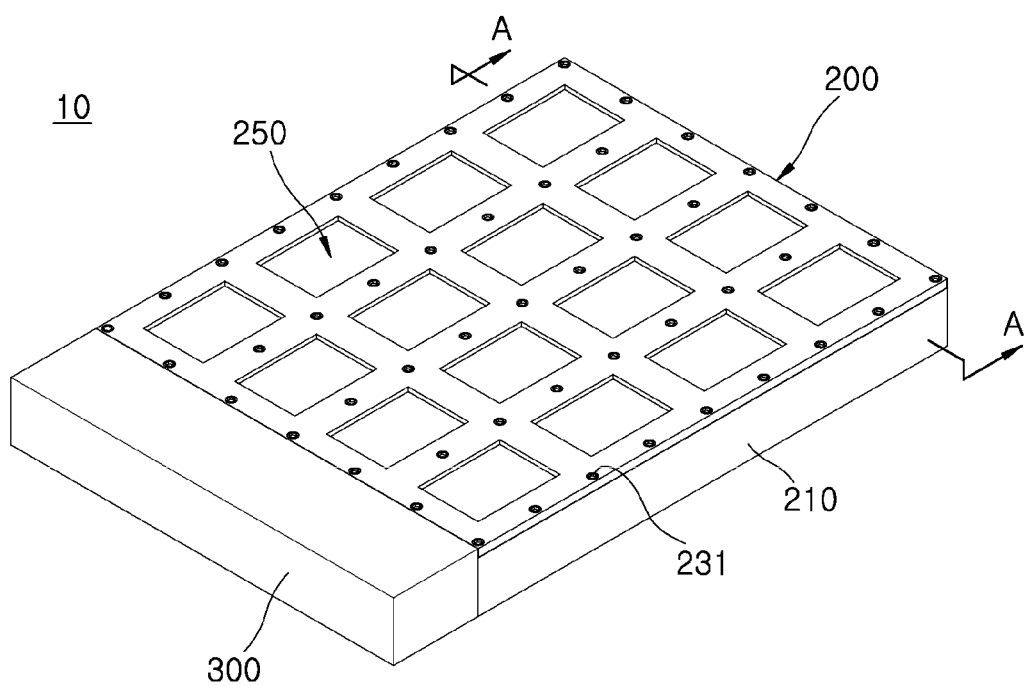
FIG. 1 is a perspective view schematically showing a battery pack according to an embodiment of the present disclosure.
Figure 2:
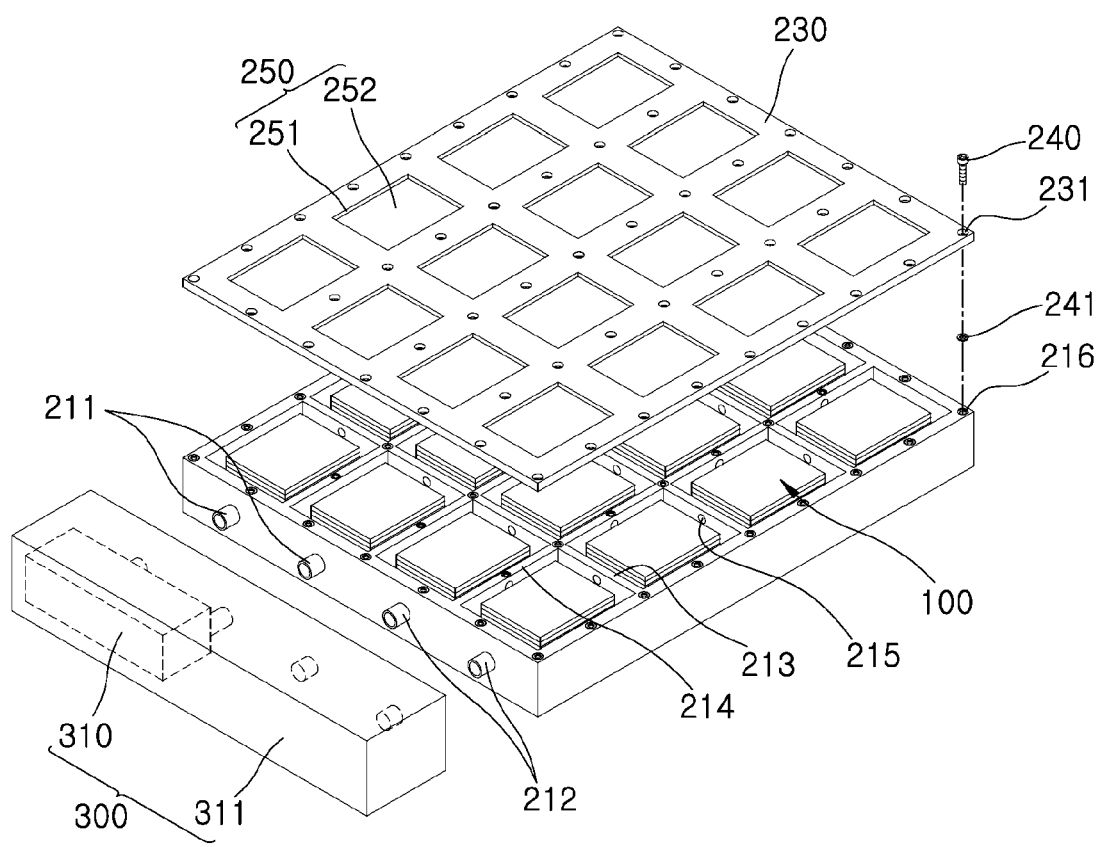
FIG. 2 is an exploded perspective view of FIG. 1.
Figure 4:
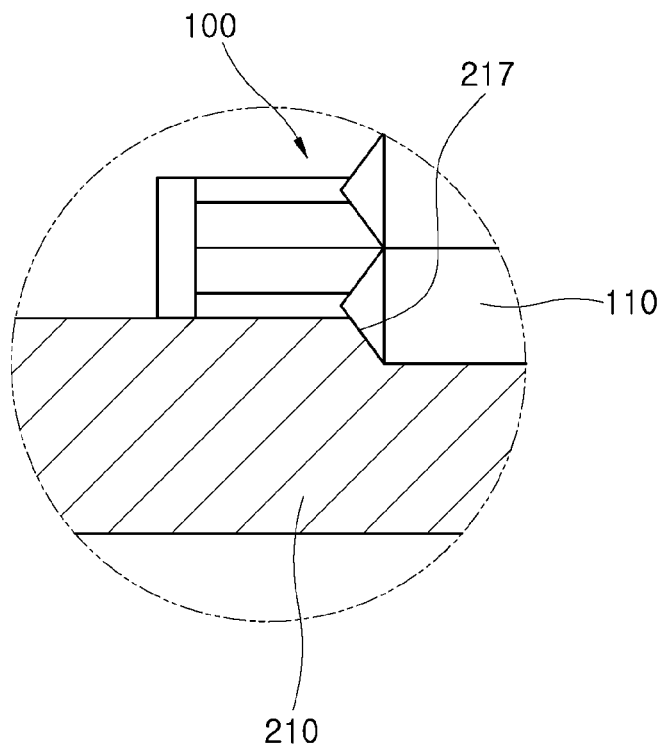
FIG. 4 is an enlarged view showing a portion B of FIG. 3.
Figure 5:
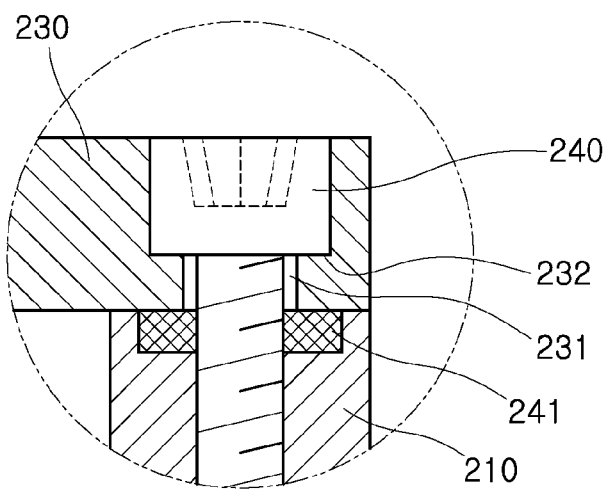
FIG. 5 is an enlarged view showing a portion C of FIG. 3.

FIG. 1 is a perspective view schematically showing a battery pack according to an embodiment of the present disclosure. FIG. 2 is an exploded perspective view of FIG. 1, FIG. 3 is a cross-sectioned view of FIG. 1, taken along the line A-A, FIG. 4 is an enlarged view showing a portion B of FIG. 3, and FIG. 5 is an enlarged view showing a portion C of FIG. 3.

A battery pack 10 may be provided to a vehicle as a fuel source of the vehicle. As an example, the battery pack 10 may be provided to an electric vehicle, a hybrid vehicle and various other-type vehicles capable of using the battery pack 10 as a fuel source. In addition, the battery pack 10 may also be provided in other devices, instruments or facilities such as an energy storage system using a secondary battery, in addition to the vehicle.

Referring to FIGS. 1 to 5, the battery pack 10 may include a battery cell assembly 100 having at least one battery cell 110, a pack casing 200 having an input port 211 and an output port 212 provided at one side thereof so that a coolant flows in and out therethrough to cool the battery cell 110, the pack casing 200 accommodating the battery cell assembly 100 to fix and support the battery cell assembly 100, and a coolant supply and circulation unit 300 connected to communicate with the input port and the output port to supply and circulate the coolant into the pack casing 200 so that each battery cell 110 is cooled in contact with the coolant.

Figure 3:
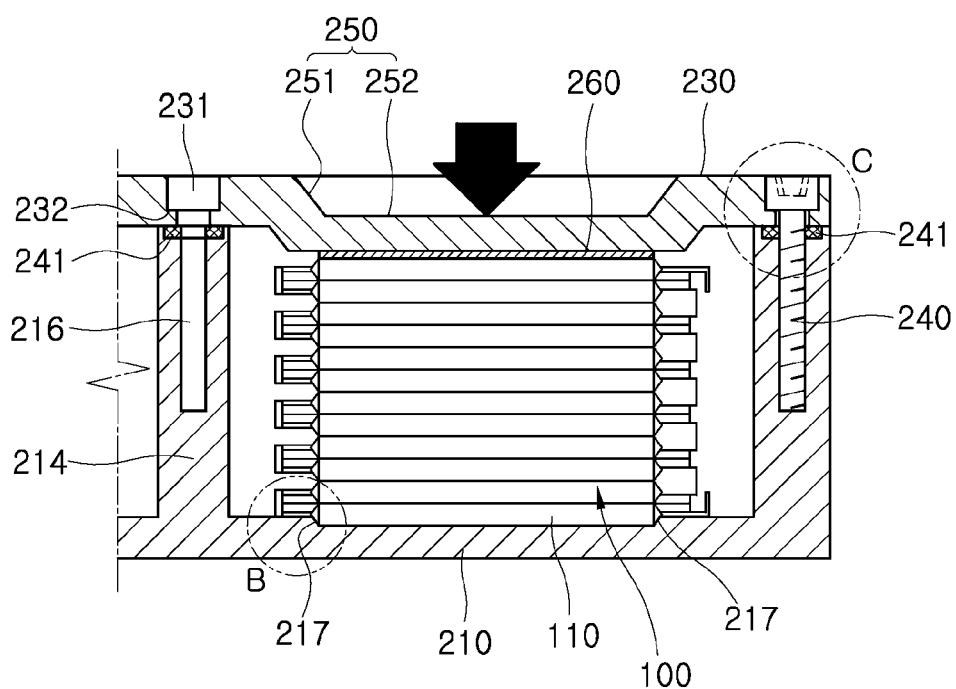
FIG. 3 is a cross-sectioned view of FIG. 1, taken along the line A-A.

Referring to FIGS. 2 and 3 mainly, the battery cell assembly 100 may include a plurality of stacked battery cells 110, and may further include various components. In more detail, the battery cell 110 may be a pouch-type secondary battery and may be provided in plural so as to be electrically connected to each other. Though not shown in the figures, each battery cell 110 may include various components such as an electrode assembly, a battery case for accommodating the electrode assembly and an electrode lead protruding out of the battery case and electrically connected to the electrode assembly. Here, the electrode lead may include a positive electrode lead and a negative electrode lead, where the positive electrode lead may be connected to a positive electrode plate of the electrode assembly and the negative electrode lead may be connected to a negative electrode plate of the electrode assembly.

In addition, although not shown in the figures, a separate cell cartridge (not shown) for guiding the assembly of the stacked battery cells 110 and securing a fixing force in the stacking process may be provided at a side surface of the stacked battery cells 110.

The pack casing 200 forms an appearance of the battery pack 10 and may provide a flow space in which a coolant may stay and flow. The pack casing 200 may accommodate the battery cell assembly 100 and the coolant.

Referring to FIG. 2 mainly, the pack casing 200 may have an input port 211 and an output port 212 formed at one side thereof so that a coolant flows in and out therethrough. The input port 211 and the output port 212 are respectively connected to communicate with the coolant supply and circulation unit 300. Meanwhile, in this embodiment, two input ports 211 and two output ports 212 are provided, but the scope of the present disclosure is not limited to any specific number or location thereof.

The pack casing 200 also serves to fix and support the battery cell assembly 100 accommodated therein. For this, the pack casing 200 includes a casing body 210 having an accommodation space in which the battery cell assembly 100 is accommodated, a casing cover 230 provided at a top surface of the casing body 210, and an elastic pressing unit 250 for elastically pressing the battery cell assembly 100.

The casing body 210 may include a plurality of horizontal partitions 213 and vertical partitions 214, and the battery cell assembly 100 may be accommodated in each accommodation space defined by the horizontal partitions 213 and the vertical partitions 214.

As shown in FIGS. 3 and 4, the casing body 210 may be depressed with an inward slope corresponding to a planar surface of the battery cell 110 to form a placing groove 217 in which a central portion of the battery cell assembly 100 is placed and fixed. The placing groove 217 allows the battery cell 110 and the battery cell assembly 100 to be more easily fixed. The placing groove 217 may also be formed to be rounded inwardly or stepped vertically, different from the above.

The casing cover 230 may be provided at the top surface of the casing body 210. The casing cover 230 is formed in a plate shape, and a plurality of coupling holes 216, 231 may be formed therein for coupling with the casing body 210. The casing cover 230 protects the battery cell assembly 100 therein and also prevents the coolant from leaking out.

The elastic pressing unit 250 may be provided on the planar surface of the casing cover 230. The elastic pressing unit 250 comes into contact with the battery cell assembly 100 and presses and supports the battery cell assembly 100 downward to fix the battery cell assembly 100.

For this, as shown in FIG. 3, each elastic pressing unit 250 may have a pair of inclined regions 251 and a depressed region 252 formed to connect ends of the inclined regions 251 to each other and depressed from the planar surface of the casing cover 230, and at least a part of the depressed regions 252 may support the top surface of the battery cell assembly 100 in contact to support the battery cell assembly 100 downward. The casing cover 230 and the elastic pressing unit 250 may be formed integrally by press working. By doing so, it is possible to reduce the manufacturing cost and lighten the secondary battery.

Also, an adhesive member 260 may be interposed between the battery cell assembly 100 and the elastic pressing unit 250 to fix the battery cell assembly 100 and the elastic pressing unit 250 to each other.

By virtue of this combination, namely the placing groove 217 of the casing body 210, the elastic pressing unit 250 of the casing cover 230, and the adhesive member 260, it is possible that the battery cell assembly 100 is firmly fixed inside the pack casing 200. In other words, even though a separate outer frame (an end plate) surrounding the battery cells 110 is not used, the battery cell assembly 100 may supported and fixed in the pack casing 200 while maintaining rigidity due to the combination of the placing groove 217 of the casing body 210, the elastic pressing unit 250 of the casing cover 230 and the adhesive member 260.

Meanwhile, the pack casing 200 may dissipate the heat of the battery cell assembly 100 to the outside. Here, the pack casing 200 may be made of aluminum material with high thermal conductivity for effective heat dissipation.

The battery pack 10 according to an embodiment of the present disclosure has a cooling structure in which a coolant (insulating oil) is circulated to directly cool the battery cells 110. For this, a coolant supply and circulation unit 300 may be provided on one side of the pack casing 200.

Referring to FIG. 2, the coolant supply and circulation unit 300 has a supply and circulation motor 310 and a staying space 311 in which a coolant flows and stays. The coolant is injected the input port 211 through the supply and circulation motor 310, and the coolant circulating the pack casing 200 may return to staying space 311 through the output port 212.

For the coolant circulation, at least one coolant circulation hole 215 may be formed in the horizontal partitions 213 and the vertical partitions 214 of the casing body 210, respectively, and the coolant may move from any one accommodation space, defined by the horizontal partition 213 and the vertical partition 214, to another accommodation space.

In order for the coolant in a fluid state to circulate in the pack casing 200 by means of the coolant supply and circulation unit 300, a structure for sealing the pack casing 200 is indispensable.

The sealing structure will be described in detail with reference to FIGS. 2, 3 and 5.

The casing body 210 and the casing cover 230 are coupled by using screws 240. The casing cover 230 has first coupling holes 231 formed at regular intervals along a periphery of the elastic pressing unit 250 through the casing cover 230 in a thickness direction, and second coupling holes 216 are formed in the horizontal partitions 213 and the vertical partitions 214 along a length direction at locations corresponding to the first coupling holes 231 so that the screws 240 are accommodated therein. A left portion of FIG. 3 shows a state where the screws 240 are omitted.

In addition, a placing and supporting portion 232 is formed at the first coupling hole 231 by depressing the first coupling hole 231 along a length direction so that a head of the screw 240 is placed and supported thereto. Also, a sealing member 241 may be interposed between the placing and supporting portion 232 and the upper periphery of the second coupling hole 216 to prevent the coolant from leaking out. The casing body 210 and the casing cover 230 may be sealed with each other by means of the sealing member 241. The casing cover 230 may be coupled to the casing body 210 by spot welding or the like, instead of screwing the casing body 210 and the casing cover 230 to each other.

The coolant supplied and circulated by the coolant supply and circulation unit 300 is for cooling the battery cell assembly 100 and may be filled in the pack casing 200 so that the battery cell assembly 100 is immersed therein. In detail, the coolant may be filled in the space between the battery cell assemblies 100 in the pack casing 200, and may also be filled in in the space between the plurality of battery cells 110.

The coolant may be made of a material with high heat capacity. Accordingly, in this embodiment, a separate structure such as a cooling pin and a heatsink may not be required to cool the battery cell assembly 100 by means of the coolant filled in the pack casing 200.

Accordingly, in this embodiment, a separate structure such as a cooling pin and a heatsink may not be used, and thus it is possible to improve the space efficiency of the battery cells 110 and reduce the manufacturing cost.

In addition, the coolant may be made of as an insulating oil or a material including the insulating oil. Since the insulating oil circulates in direct contact with the battery cells 110, the cooling effect may be excellent. In addition, even though the battery cell 110 is ignited, ignition may be blocked and prevented by the coolant due to the specific heat difference of the coolant.

Also, the coolant may act as a damper for the battery cell assembly 100 at the inside of the pack casing 200. The battery cell assembly 100 may be vulnerable to external impacts. However, since the coolant is filled in the space between the battery cells 110 of the battery cell assembly 100 and filled in the space between the pack casing 200 and the battery cell assembly 100, it is possible to lessen the external impact to the battery cell assembly 100, and as a result, to ensure the safety of the battery pack 10.

Hereinafter, the operations of the battery pack 10 of this embodiment configured as above will be described in detail.

Figure 6:
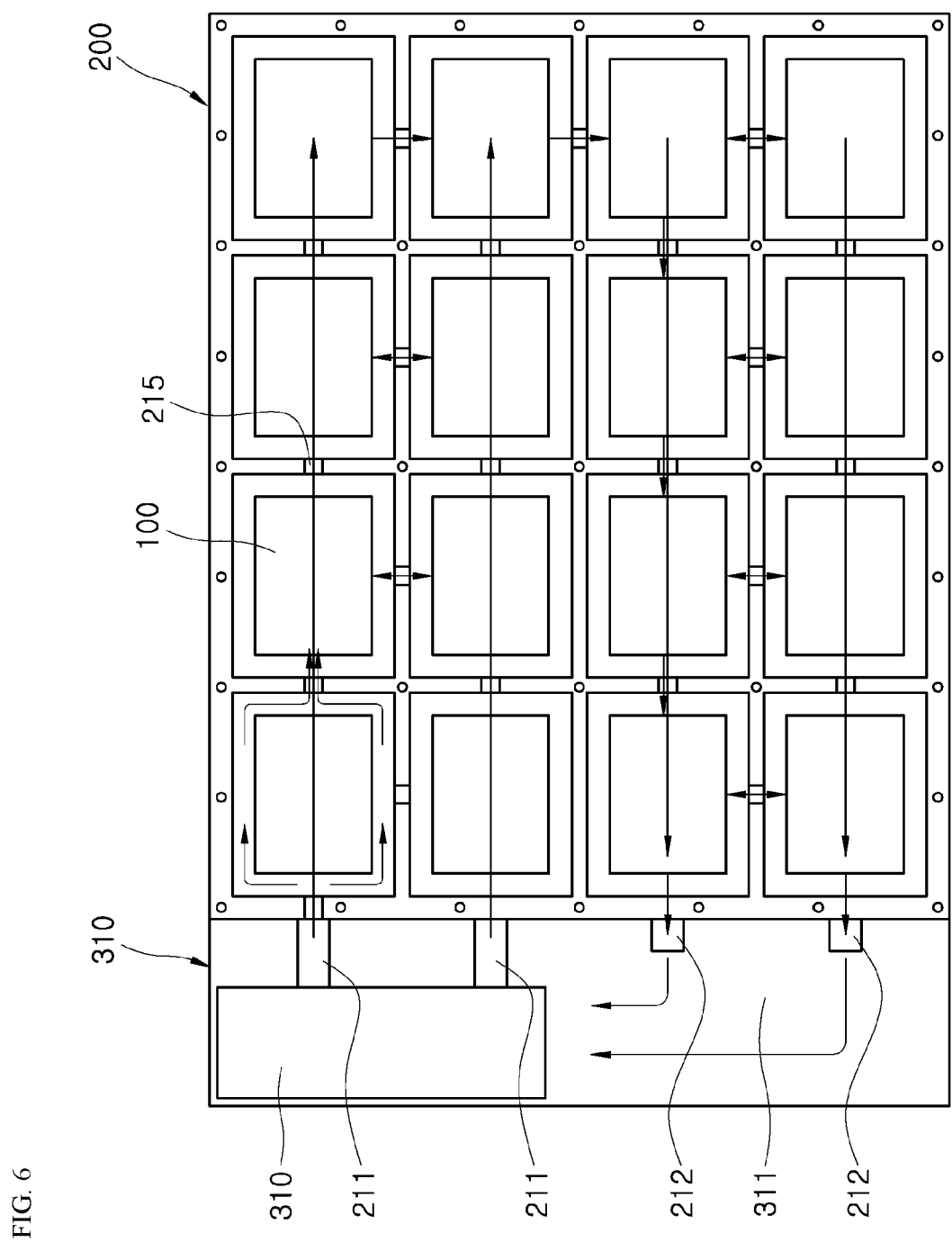
FIG. 6 is a schematic view for illustrating a coolant circulating process, performed by a coolant supply and circulation unit of the battery pack according to an embodiment of the present disclosure.

FIG. 6 is a schematic view for illustrating a coolant circulating process, performed by a coolant supply and circulation unit of the battery pack according to an embodiment of the present disclosure.

First, referring to FIG. 3, each battery cell 110 and each battery cell assembly 100 of the battery pack 10 may be firmly fixed by elastically pressing the plurality of battery modules by means of the elastic pressing unit 250 of the casing cover 230 and the placing groove 217 of the casing body 210.

Accordingly, in this embodiment, when the plurality of battery cell assemblies 100 are mounted in the casing body 210, a separate outer frame, namely an additional component such as an end plate and a tension bar, for stably fixing the plurality of battery cells 110 is not demanded, and thus it is possible to reduce the manufacturing cost of the battery pack 10.

Referring to FIG. 6 mainly, the coolant may be circulated within the battery pack 10 in contact with the plurality of battery cells 110 and the battery cell assembly 100 by means of the coolant supply and circulation unit 300. In other words, the coolant injected from the supply and circulation motor 310 flows into the pack casing 200 through the input port 211, flows in direct contact with the battery cell 110 and flows through the coolant circulation hole 215 to circulate to each accommodation space. Finally, the coolant may move to the staying space 311 of the coolant supply and circulation unit 300 through the output port 212.

In this embodiment, the cooling efficiency of the plurality of battery cells 110 may be significantly improved by means of the circulating coolant.

Moreover, in this embodiment, by means of the coolant circulating structure, a conventional cooling device such as a plurality of cooling pins, heatsinks or the like may not be used, and thus it is possible to reduce the manufacturing cost. In addition, the space efficiency of the battery cells 110 may be improved as much, and thus the energy density of the battery cells 110 may be increased.

As described above, in this embodiment, it is possible to provide the battery pack 10, which may reduce the manufacturing cost and improve the energy density of the battery cells 110 while enhancing the cooling performance. In addition, any devices, instruments or facilities, such as a vehicle, including the battery pack 10 according to this embodiment may also have all the advantages of the battery pack 10 as described above.

While the embodiments of the present disclosure have been shown and described, it should be understood that the present disclosure is not limited to the specific embodiments described, and that various changes and modifications can be made within the scope of the present disclosure by those skilled in the art, and these modifications should not be understood individually from the technical ideas and views of the present disclosure.

What is claimed is:

1. A battery pack, comprising:
a plurality of battery cell assemblies, each battery cell assembly having at least one battery cell;
a pack casing having an input port and an output port provided at one side thereof so that a coolant flows in and out therethrough to cool the battery cell, the pack casing accommodating the battery cell assembly to fix and support the battery cell assembly; and
a coolant supply and circulation unit connected to communicate with the input port and the output port to supply and circulate the coolant into the pack casing whereby each battery cell is cooled in contact with the coolant,
wherein the pack casing includes:
a casing body having a plurality of horizontal partitions and vertical partitions to form a plurality of accommodation spaces arranged in a horizontal plane, each accommodation space receiving a corresponding battery cell assembly of the plurality of battery cell assemblies;
a casing cover provided at an upper surface of the casing body; and
a plurality of elastic pressing units provided on the casing cover and arranged in a horizontal plane, each elastic pressing unit being associated with a single corresponding accommodation space to elastically press the corresponding battery cell assembly located therein.

2. The battery pack according to claim 1,
wherein the casing body is depressed with a slope or at a right angle corresponding to a planar surface of the battery cell to form a placing groove in which the battery cell assembly is placed.

3. The battery pack according to claim 2,
wherein the elastic pressing unit has a pair of inclined regions and a depressed region connecting ends of the inclined regions to be depressed from a planar surface of the casing cover, and
wherein at least a part of the depressed region of the elastic pressing unit supports in contact with a top surface of the battery cell assembly to press the battery cell downwards.

4. The battery pack according to claim 3,
wherein an adhesive member is interposed between the battery cell assembly and the elastic pressing unit to fix the battery cell assembly and the elastic pressing unit to each other.

5. The battery pack according to claim 1,
wherein the casing body and the casing cover are coupled by using screws, and
wherein the casing cover has first coupling holes formed at regular intervals along a periphery of the elastic pressing unit through the casing cover in a thickness direction, and second coupling holes are formed in the horizontal partitions and the vertical partitions along a length direction at locations corresponding to the first coupling holes so that the screws are accommodated therein.

6. The battery pack according to claim 5,
wherein a placing and supporting portion is formed at the first coupling hole by depressing an inner side of the first coupling hole along a length direction so that the screw is placed and supported thereat, and
wherein a sealing member is interposed between the placing and supporting portion and a top surface of the second coupling hole to prevent the coolant from leaking out.

7. The battery pack according to claim 1,
wherein at least one coolant circulation hole is formed in the horizontal partition and the vertical partition.

8. The battery pack according to claim 1,
wherein the casing cover and the elastic pressing unit are provided integrally by means of press working.

9. The battery pack according to claim 1,
wherein the pack casing is made of aluminum material, and
wherein the coolant is an insulating oil.

10. A vehicle, comprising the battery pack defined in claim 1.

11. A battery pack, comprising:
a battery cell assembly having at least one battery cell;
a pack casing having an input port and an output port provided at one side thereof so that a coolant flows in and out therethrough to cool the battery cell, the pack casing accommodating the battery cell assembly to fix and support the battery cell assembly, and the pack casing including:
   a casing body having a plurality of horizontal partitions and vertical partitions to form an accommodation space in which the battery cell assembly is accommodated;
   a casing cover provided at an upper surface of the casing body; and
   an elastic pressing unit provided on the casing cover to elastically press the battery cell assembly;
a coolant supply and circulation unit connected to communicate with the input port and the output port to supply and circulate the coolant into the pack casing whereby each battery cell is cooled in contact with the coolant; and
an adhesive member located on an inner surface of the casing cover and being interposed between the battery cell assembly and the elastic pressing unit to fix the battery cell assembly and the elastic pressing unit to each other.

* * * * *